Patented Jan. 29, 1935

1,989,108

UNITED STATES PATENT OFFICE 1,989,108

PROCESS OF PRODUCING NONSTRUCTURAL ACTIVATED CARBON

Jacque C. Morrell, Oak Park, Ill.

No Drawing. Application May 22, 1933,
Serial No. 672,232

8 Claims. (Cl. 252—3)

This invention relates to the production of adsorptive or activated carbons. More particularly, it relates to an improvement in the process of my application Serial No. 624,051.

It is the main object of this invention to produce non-structural adsorptive or activated carbons. In activated carbons of this type it is not important that the supporting walls of the individual particles be dense or firm or that the particle or grain itself possess the structural strength required of the granular type of carbons. An example of the latter is bone black, such as is employed in filter columns in the refining of sugar, or the activated charcoals such as cocoanut char used for gas adsorption, in gas masks, etc. The structural strength of these and other types of chars is of highest importance since the life of the material depends upon its maintaining its original size and granular form. The adsorptive qualities of such chars depend to a large extent upon the number and character of the pores therein. It is to be understood in connection with the present invention that the materials undergoing treatment may be in a relatively loosely coherent condition in intermediate stages of the process, and this is desirable as it facilitates operation and treatment. However, the final product is employed and is generally useful only in a finely divided form (e. g. 100 mesh or above) and the external surface effect as well as the quality of the product enters into its efficiency as a refining, purifying or decolorizing agent. The product of the present process is employed in a finely divided condition mainly by what is known as the contact method, wherein the material in finely divided or powdered form is contacted with the liquid to be treated and subsequently removed by filtration rather than by being placed in situ, such as in a filter column and passing or filtering the liquid through it. The term "non-structural" as used in the claims further means a material which is employed in a relatively finely divided or powdered condition and which does not depend necessarily for its usefulness or utility on its ability to withstand or resist shattering, abrasion and crushing and to be retained in a granular or particle form of relatively large size.

The product of the process may be employed in various industrial processes as a decolorizing and purifying agent for the removal of color and impurities from liquids and solutions, and, in general, it may be applied wherever adsorptive decolorizing or purifying material of non-structural character is required. Among its specific uses are the refining and decolorization of oils and their derivatives; the refining and decolorizing of animal and vegetable oils; as a catalyst; for decolorizing, purifying and refining sugar solutions, syrups such as those from cane, corn, maple and sorghum, glycerine, and aqueous and non-aqueous solutions of organic and inorganic compounds; purification of gelatins, phenols, drugs, pharmaceuticals, and the bleaching and purification of various crude and partly refined off-grade and off-flavored food and vegetable oils, including cottonseed, linseed, rapeseed, cocoanut, soya bean, and animal oils and fats, such as lard, fish oils, medicinal oils, etc. Some special fields of application are: industrial water, garage wastes, paint oils, varnishes and resins, medicinals generally, recovery of waste photographic solutions, recovery of precious metals, and the like.

In one aspect the present invention comprises mixing finely divided carbon or charcoal with a binder which chars on heating, subjecting the mixture to a temperature adequate to carbonize the said binder and thereafter to an activation treatment, such as treatment with steam at elevated temperatures or with other mild oxidizing agents. In all cases the product is subsequently treated with a solvent such as dilute acid to remove ash or inert substances therefrom. The final product of the present invention is of non-structural form and is generally employed as a powder or in finely divided form.

In one of its more specific aspects the present invention comprises mixing a carbon such as wood charcoal, preferably in finely divided form and particularly hardwood charcoal, with a specific tar or pitch obtained from the destructive distillation of hardwood, which will be more fully described hereinafter. Other types of relatively easily activated chars, such as those obtained from vegetable matter generally, such as chars from straws and hulls, and carbons from low temperature carbonization of organic matter, such as carbon black, may be employed instead of wood char but are not equivalent thereto and the wood char is preferred. The specific binder employed in the present invention is obtained from the destructive distillation of hardwood and is usually referred to as soluble tar or dissolved tar, and preferably the pitch derived from the reduction by distillation of this tar is employed as the binder.

In order to more fully describe the origin and character of the tar employed as the binder in the present invention, when wood, particularly hardwood, is carbonized in the usual manner the products produced are generally charcoal, fixed gas, an aqueous solution containing acetic acid, methyl alcohol and other dissolved products, and a tarry or oily layer which settles as a separate product in the receiver. This tarry or oily layer is specifically referred to as "settled tar" and is generally the product referred to as wood tar in the industry. The pitch derived from this tar is also generally the product known as "wood tar pitch" in the industry. In the present invention, however, the product employed as the binder is that recovered from the aqueous or pyroligneous acid layer of the destructive distillation of wood and is usually referred to in the wood distillation industry as "dissolved", "soluble", or "residual" tar, as it accumulates in the still employed for the distillation of the aqueous layer.

In outward appearance the dissolved or soluble tar differs very little from the settled tar but apparently its composition is quite different. The dissolved tar is always left as a residue in the still after the distillation of crude, pyroligneous acid, and the tar in general must be eliminated from the acid when acetate of lime is one of the desired products. According to general theory the dissolved tar is probably formed from the volatile components of pyroligneous acid, such as aldehydes and phenols, as a result of secondary reactions, polymerization, condensation and the like, and is looked upon by some as an aldehyde resin rather than as a tar in the strict sense. Partial solubility in water and its behavior generally on distillation further distinguish it from the settled tar.

Even though the dissolved tar is usually exposed to a temperature of about 300° F. it may still contain a considerable quantity of acetic acid. Approximately 60% of pitch is produced from it on distillation. It may also be generally characterized by the very low yields, if any, of light and heavy oils produced on distillation compared with the settled tar.

Because of its general characteristics and because of its moderate solubility in water in general it cannot be used for the same purposes as settled tar, such as water-proofing, paints and the like, and the pitch derived from it cannot be used for such purposes as rubber compounding and other uses for the pitch derived from the settled tar. It is not even very satisfactory as a fuel because of its relative low B. t. u. value and difficulty in burning it.

The dissolved or soluble tar is, therefore, practically a worthless by-product in the wood distillation industry. The amount of this tar formed is practically equal to the amount of settled tar. In the production of the soluble tar the aqueous layer referred to as pyroligneous acid from the settling tanks is introduced into a copper still equipped with closed steam coils (although triple-effect evaporators are sometimes used for this purpose) and the residue of soluble tar is allowed to accumulate in the still over a period of several days' operation, after which it may be steam-distilled to more completely free it from pyroligneous acid and other water-soluble constituents.

This soluble or dissolved tar may be used directly or preferably reduced further to pitch and an overhead product, as desired, in connection with the present invention. I have found that this soluble tar or pitch derived therefrom when mixed with finely divided charcoal, in accordance with the methods previously described in my issued patents and co-pending applications, e. g., preferably while in emulsified condition, permits the production of a highly active decolorizing charcoal in accordance with the process of the present invention.

While I prefer to employ the process of mixing the carbon with the binder disclosed in my patent, Serial #1,440,356, wherein some form of carbon or charcoal is mixed with an emulsion of a binder which chars on heating, other methods of incorporating the charcoal with the binder may be employed as disclosed in the aforementioned issued patents. Some of the methods of accomplishing the mixing are:

(a) The carbon may be mixed directly with the emulsified binder either as such or the carbon may be suspended in an aqueous medium and mixed with the emulsified binder. In many cases the water contained in the emulsion will be separated by filtration, etc., but in most cases the mixture containing the emulsion may be heated directly to carbonize the binder.

(b) The carbon may be mixed with a solution of the binding material which chars on heating, separating the solvent by distillation. The solvent may be a relatively low boiling liquid such as benzol, naphtha, petroleum hydrocarbons or coal tar fractions, or higher boiling solvents may be used and separated during the carbonizing treatment.

(c) The carbon may be mixed with the liquid binder which chars on heating, such as tar directly produced or similar product thereto such as an an oil added to the pitch.

(d) The carbon may be mixed with the non-fluid (solid) pitch and may also thereafter be mixed with a fluid such as oil, tar, or other organic liquid which will dissolve, disperse or flux with the binder.

(e) The carbon may be mixed directly with the pitchy binding material by heating the same, thus rendering it quite fluid, and intimately mixing the finely divided carbon therewith, preferably by mechanical means.

Other tars, such as "settled" wood tar and coal tar may be blended with the soluble tar. Corresponding pitches may also be mixed. When employed as emulsions the binders may be emulsified in any well known manner.

In some cases it may be desirable to add to the mixture of carbon and binder a substance which is to be later removed by solution with a solvent, for example, calcium or magnesium carbonate, calcium or magnesium oxide, or in general finely divided metals, oxides of metals, salts, etc. These substances and ash may be removed from the carbonized and activated product by treatment with a solvent, for example, water when the material is water-soluble, and a dilute acid, for example, hydrochloric, when the material is acid-soluble. It may also be desirable to add substances to the material which volatilizes and/or reacts with the carbonaceous material during the treatment, such as zinc chloride, phosphoric acid and similar materials.

It is to be understood that the above methods are not to be considered as equivalent in the sense of quality of product or results produced, the particular method chosen depending on the raw materials employed and results desired.

In carrying out the process of my invention finely divided carbon, for example, hardwood charcoal, may be mixed with water containing a protective colloid and thereafter mixed with an emulsion of the soluble wood tar hereinbefore referred to, or with a suspension of a finely divided hard pitch derived from the said wood tar, to which has been added an emulsion of oil in an emulsifying agent, for example, casein dissolved in a dilute solution of an alkali such as sodium carbonate. For example, the finely divided pitch from soluble wood tar may be ground and suspended in water, preferably containing a small amount of protective colloid, such as casein dissolved in an alkali solution. This suspension may be mixed with an emulsion of oil, for example a coal tar oil such as creosote oil, or a wood tar oil, and the resulting emulsion may be mixed with the finely divided carbon. The other methods of mixing the binder may also be employed. Where an emulsified binder is employed the water is preferably separated before proceeding to the next step of the process. However, if an excess of water is not present its removal may be effected by the heat treatment.

The mixture is then subjected to heat treatment to carbonize it. The carbonized product is then subjected to activation by steam treatment or by other oxidizing gas, such as air, chlorine, flue gas and the like, or other activating treatments. In the present example when hardwood charcoal or similar carbon base is employed the carbonized and steam-treated char is preferably subjected to treatment with hot water and/or dilute acids, such as hydrochloric acid, to remove ash and other impurities, subsequently water washed and then dried.

In the carbonizing treatment temperatures of from approximately 900° F. to 1800° F., more or less, may be employed. For steam activation or other gas activating treatments temperatures of from 1500° F. to 1800° F., more or less, may be employed. The acid concentrations for the treatment of the activated products (when employed) may vary from less than 1% to 10% and upwards and various acids may be employed, such as hydrochloric, sulphuric, etc. During carbonization and activation the time of treatment will depend upon temperature conditions as well as other conditions, and schedules varying from fifteen minutes up to several hours and longer have been employed.

In the carbonization operation, heating schedules from twenty minutes to two hours at temperatures varying from 1200° F. to 1500° F. have been found satisfactory. Generally speaking, carbonization in thin layers is preferred. The use of a continuous rotary type of furnace has been found satisfactory. The principal object here is to heat the material uniformly and prevent formation of secondary inactive carbon. After the carbonization treatment the charge is subjected to a second heat treatment in the presence of steam at temperatures between approximately 1500° F. and 1800° F. for about forty minutes to five hours. In some cases it has been found desirable to introduce steam into the charge while undergoing carbonization.

It is usually preferred that the carbon base be ground to 100 mesh or above, although approximately 50 mesh and above may be found satisfactory.

The binder, e. g., the pitch, also serves to build up a weakly coherent structure which is desirable during processing, e. g., heating and solvent treatment where the latter is required, as well as in the final product even though it is usually comminuted to more or less fine particles, although it is not suitable as a truly structural char and is distinctly different from it.

In general, a ratio of approximately 1 to 6 parts of the wood charcoal to 1 of the pitch, or vice versa, with 3 parts of the carbon to 1 of pitch as the preferred ratio, is employed.

The proportions of various materials are given merely as examples and they may vary more widely depending upon the results desired, e. g., a larger ratio of carbon to binder may be employed in some cases.

The binder in the above cases may be incorporated in any of the manners described but preferably are incorporated in emulsified state as described in detail above.

As specific examples of the results obtained from the process of my invention, a soluble wood tar containing approximately 60% of pitch when reduced by distillation to a pitch of approximately 220° F. melt point is mixed with finely divided hardwood char of from 50 to 200 mesh employing approximately 2.5 parts of char to 1 of the soluble tar. Good results were obtained when the soluble tar was mixed with water containing approximately 20 to 40% fine wood char, based on the water, to form a temporary emulsion and then adding the remaining char together with additional aqueous medium as required. The water may also preferably contain an emulsifying agent. Similar methods of mixing may also be employed. The mixture is generally heated to drive off the water and then carbonized gradually, bringing up the temperature to approximately 1350° F. and maintaining the same for a period of two hours. The product at this stage is in a weakly coherent condition. The carbonized material is then subjected to steam treatment at a temperature of approximately 1650° F. over a period of four hours. The resulting product may be finely ground and subjected to treatment with a 2% solution of hydrochloric acid to remove the ash and other impurities. This product is then water-washed and dried. It was found to have comparable and equivalent decolorizing values (using raw cane sugar solutions and corn sugar liquors on an arbitrary scale) to several well known high grade commercial products showing decolorizations of approximately 83% under test conditions.

In another example a 220–250° F. melt point hard pitch obtained from the distillation of soluble tar was ground to 50 mesh and above and suspended in an aqueous medium containing approximately 2% of casein in a solution of sodium carbonate (other protective colloids and emulsifying agents have also been found satisfactory). To this suspension is added approximately 30% (by weight of the pitch) of creosote oil in an emulsified condition in a similar aqueous medium. Coal tar, wood tar, and other hydrocarbon distillates, have been found generally suitable for this purpose. The emulsified binder preferably containing the minimum amount of water required for emulsification is then mixed with finely divided hardwood char in the proportion of approximately 2.5 to 3 parts of char to 1 of the hard pitch in the binder mixture. The mixture is then dried directly and subjected to carbonization at a temperature of approximately 1350° F. for approximately one hour. The weakly coherent product is then subjected to steam activation for a period of four hours at a temperature of approximately 1675° F. This product after acid treatment removed approximately 90% of the coloring matter in the standard solution containing raw cane sugar or raw corn sugar liquor. With more dilute solutions of these test sugars practically all of the coloring matter could be removed and the product was better than most of the available decolorizing carbons.

Results comparable to those shown may be obtained by the other modifications described herein but the method used in these specific cases is preferred as giving superior results generally. The method selected depends on the results desired and the raw materials employed.

The above examples are given for illustrative purposes only, and it may be readily recognized that many combinations of carbon bases and binders, singly or in admixture, may be employed within the scope of the invention. It may be also recognized that the conditions of treatment, such as time and temperatures of carbonizing and activation, may vary, all within wide limits. Hence the specific examples are not to be considered as limitations upon the broad scope and spirit of the invention.

I claim as my invention:

1. A process for the production of non-structural activated carbon suitable for refining, purifying and decolorizing purposes which comprises mixing wood charcoal with a binder comprising soluble wood tar, subjecting the mixture to a temperature adequate to carbonize and to char the binder, and activating the resulting product by heating in the presence of an oxidizing gas.

2. A process for the production of non-structural activated carbon suitable for refining, purifying and decolorizing purposes which comprises mixing wood charcoal in finely divided form with a binder comprising soluble wood tar patch, subjecting the mixture to a temperature adequate to carbonize and to char the binder, and activating the resulting product by heating in the presence of an oxidizing gas.

3. A process for the production of non-structural activated carbon suitable for refining, purifying and decolorizing purposes which comprises mixing hardwood charcoal in finely divided form with a binder comprising soluble wood tar, subjecting the mixture to a temperature adequate to carbonize and to char the binder, the said mixture not having been subjected to substantial pressure prior to carbonizing the binder therein, and activating the resulting product by heating in the presence of steam.

4. A process for the production of non-structural activated carbon suitable for refining, purifying and decolorizing purposes which comprises mixing hardwood charcoal in finely divided form with a binder comprising soluble wood tar pitch, subjecting the mixture to a temperature adequate to carbonize and to char the binder, the said mixture not having been subjected to substantial pressure prior to carbonizing the binder therein, and activating the resulting product by heating in the presence of steam.

5. A process for the production of non-structural activated carbon suitable for refining, purifying and decolorizing purposes which comprises mixing hardwood charcoal in finely divided form with a binder comprising soluble wood tar, subjecting the mixture to a temperature adequate to carbonize and to char the binder, the said mixture not having been subjected to substantial pressure prior to carbonizing the binder therein, activating the resulting product by heating in the presence of steam, and subjecting the resulting product to the action of a dilute acid to remove ash and other undesirable impurities.

6. A process for the production of non-structural activated carbon suitable for refining, purifying and and decolorizing purposes which comprises mixing hardwood charcoal in finely divided form with a binder comprising soluble wood tar pitch, subjecting the mixture to a temperature adequate to carbonize and to char the binder, the said mixture not having been subjected to substantial pressure prior to carbonizing the binder therein, activating the resulting product by heating in the presence of steam, and subjecting the resulting product to the action of a dilute acid to remove ash and other undesirable impurities.

7. A process for the production of non-structural activated carbon suitable for refining, purifying and decolorizing purposes which comprises mixing hardwood charcoal in finely divided form with a binder comprising an emulsion containing soluble wood tar, subjecting the mixture to a temperature adequate to carbonize and to char the binder, the said mixture not having been subjected to substantial pressure prior to carbonizing the binder therein, and activating the resulting product by heating in the presence of steam, and subjecting the resulting product to the action of a dilute acid to remove ash and other undesirable impurities.

8. A process for the production of non-structural activated carbon suitable for refining, purifying and decolorizing purposes which comprises mixing hardwood charcoal in finely divided form with a binder comprising an emulsion containing soluble wood tar pitch, subjecting the mixture to a temperature adequate to carbonize and to char the binder, the said mixture not having been subjected to substantial pressure prior to carbonizing the binder therein, and activating the resulting product by heating in the presence of steam, and subjecting the resulting product to the action of a dilute acid to remove ash and other undesirable impurities.

JACQUE C. MORRELL.